US010285413B2

(12) United States Patent
Clark et al.

(10) Patent No.: US 10,285,413 B2
(45) Date of Patent: May 14, 2019

(54) PROCESS FOR THE PREPARATION OF LACTOSE-FREE AND REDUCED PHOSPHORUS SKIM MILK

(71) Applicants: George H. Clark, Woburn, MA (US); Mary Ann Clark, Woburn, MA (US)

(72) Inventors: George H. Clark, Woburn, MA (US); Mary Ann Clark, Woburn, MA (US)

( * ) Notice: Subject to any disclaimer, the term of this patent is extended or adjusted under 35 U.S.C. 154(b) by 25 days.

(21) Appl. No.: 15/641,104

(22) Filed: Jul. 3, 2017

(65) Prior Publication Data

US 2018/0000104 A1    Jan. 4, 2018

Related U.S. Application Data

(60) Provisional application No. 62/493,422, filed on Jul. 2, 2016.

(51) Int. Cl.
*A23C 9/142* (2006.01)
*A23C 9/152* (2006.01)

(52) U.S. Cl.
CPC .......... *A23C 9/1422* (2013.01); *A23C 9/1522* (2013.01); *A23C 2210/252* (2013.01); *A23C 2240/20* (2013.01)

(58) Field of Classification Search
CPC ............... A23L 9/1522; A23C 2210/30; A23C 2240/20

USPC .......................................... 426/74, 491, 580
See application file for complete search history.

(56) References Cited

U.S. PATENT DOCUMENTS

| 4,840,814 A | 6/1989 | Harada et al. |
| 4,968,513 A | 11/1990 | Watanabe et al. |
| 2009/0123602 A1 | 5/2009 | Yan et al. |
| 2013/0337113 A1 | 12/2013 | Clark et al. |

OTHER PUBLICATIONS

Urbano, Blowing Bubbles to Acidify Water, Montessori Muddle, Sep. 11, 2012; p. 1; retrieved from <http://montessorimuddle.org/2012/09/11/blowing-bubbles-to-acidify-water/>.

*Primary Examiner* — Helen F Heggestad
(74) *Attorney, Agent, or Firm* — Lorusso & Associates

(57) ABSTRACT

A method of preparing a low calorie, Lactose-free and Phosphorus-reduced milk with multiple filtration, centrifugation, carbonation and phase separation steps to remove Lactose and Phosphorus from milk including skim milk. The method includes a filtration apparatus to employ ultrafiltration to remove Lactose and any component of Lactose. Ultra-Centrifugation is used additionally to increase and complete the removal of Lactose and to facilitate the reduction of Phosphorous in the final milk preparation. The process eliminates the conventional use of lactase enzyme to hydrolyze Lactose into its simple sugar components.

9 Claims, No Drawings

PROCESS FOR THE PREPARATION OF LACTOSE-FREE AND REDUCED PHOSPHORUS SKIM MILK

CROSS-REFERENCE TO RELATED APPLICATIONS

This regular utility application claims the benefit of U.S. Provisional Application Ser. No. 62/493,422, filed Jul. 2, 2016, the contents of which are incorporated herein by reference.

FIELD OF THE DISCLOSURE

This disclosure relates to methods for preparing milk to remove specific milk components. More particularly, the disclosure relates to methods to remove Lactose and a portion of the phosphorus content from skim milk.

BACKGROUND OF THE DISCLOSURE

Lactose-free milk has become increasingly popular as a large part of the world population is Lactose Intolerant (humans unable to metabolize Lactose naturally present in milk). This problem is caused by the absence of a digestive enzyme that breaks down Lactose, which is also known as milk sugar. When a person who suffers from Lactose Intolerance ingests Lactose-laden products such as milk, the Lactose passes undigested into the lower gastrointestinal (GI) tract. Bacteria populations, naturally resident in the lower GI tract, digest the Lactose and produce gas as a byproduct of the digestion. The gas production causes bloating and painful cramping in the host individual.

To address this issue, manufacturers chemically alter Lactose with an enzyme, lactase, that chemically cleaves the disaccharide Lactose sugar into its two constituent simple sugars or monosaccharides, Glucose and Galactose. These simple sugars do not require additional processing as the intestinal tracks of Lactose-intolerant individuals can absorb the monosaccharides directly into the bloodstream. These monosaccharides make milk taste sweeter as the monosaccharides bind differently to sweetness receptors on tongues. Although sweeter tasting, Lactose-free milk contains the same calories as Lactose-laden milk since the monosaccharides remain in the milk. Moreover, use of lactase requires an additional twenty hours of incubation to complete the hydrolysis process at 40° F. Manufacturers have tried to address these issue with purely mechanical means and with a modified combination of mechanical and chemical means to produce low-calorie, Lactose-free milk products.

With respect to a purely mechanical means of removing Lactose, filtration has been used to separate Lactose from other milk components. Lactose-free skim milk prepared by Ultra-Filtration (UF) alone has long been popular with manufacturers of reduced-carbohydrate foods and beverages as a versatile ingredient that can offer more protein, calcium and potassium without Lactose. To create UF skim milk, processors pass skim milk through a membrane that separates components by molecular size. Smaller molecules, e.g., Lactose, soluble minerals and water, pass through the membrane while larger molecules, e.g., casein and whey proteins, are retained. It is this retained material that constitutes UF skim milk. Unfortunately, apart from removing Lactose, this process also removes some important milk components beneficial to human health. These Lactose-reduced products often are fortified with minerals and vitamins to replace the removed nutrients. By removing Lactose with filtration, the calories associated with Lactose also are removed. Milk and milk products produced in this manner are lower in calories, but are not as sweet as unfiltered milk. The filtration process, however, is imperfect and does not remove all the Lactose, which does not solve the problem faced by Lactose-intolerant individuals that consume milk.

To eliminate any Lactose remaining in the UF milk after the UF filtration process, a chemical process is applied after the mechanical filtration process. The remaining Lactose is hydrolyzed with the lactase enzyme into the previously described monosaccharides. The need for an enzyme to breakdown the Lactose adds a significant cost and previously noted time component to the production of Lactose-free milk. In addition, because the monosaccharides remain in the finished milk-based product, the calories associated with Lactose via the simple sugar components of Lactose also remain. This means that the conventional methods used to eliminate Lactose during Lactose-free milk production do not eliminate the calories associated with Lactose.

Ultra-filtered (UF) milk, processed using conventional methods, is used to produce popular new dairy-based products and dairy-based foods and beverages that are higher in protein, calcium, potassium, and lower in carbohydrates. Notably, there are low-calorie versions of Lactose-free milk, but these products involve the removal of other high caloric components of whole milk other than Lactose, or its monosaccharide components. As explained, in conventional UF milk, the Lactose is partially filtered out and any remaining Lactose is reduced to its two simple sugar components with lactase and not removed from the final product. Currently, low-calorie, Lactose-free skim milk used for these products must be imported into the Western Hemisphere from Spain, Finland or India as there are no current commercial producers for this milk product in the Western Hemisphere. What is needed and what we have created is a low-cost, enzyme-free process to eliminate Lactose in milk and the calories in milk derived from Lactose.

Another problem associated with skim milk products and milk products in general is the presence of phosphorus. For individuals with compromised health, and compromised kidneys in particular, the presence of phosphorus in beverage and food products can be life threatening when the kidneys are not able to filter out and remove the phosphorus. Currently, there are no Phosphorus-reduced milk products commercially available anywhere in the world. What is needed and what we have created is a second process that may be used alone, or in combination with the Lactose removal process, to significantly reduce the presence of phosphorus in milk. Milk, when properly prepared and processed in accordance with the disclosure herein, is advantageous for special consumption by individuals suffering from advanced kidney disease that require lower phosphorus content in consumed milk products.

Collectively, what is needed and what we have developed are relatively low-cost Lactose and phosphorus removal processes that eliminate the need to hydrolyze Lactose and that produce collectively a very low-calorie, skim milk digestible by Lactose-intolerant individuals and/or by those unable to metabolize phosphorus. Separately, each process can be used to produce either low calorie, Lactose-free skim milk, or skim milk with low phosphorous content. These and other objects of the disclosure will become apparent from consideration of the following summary and detailed description sections of the disclosure.

SUMMARY OF THE DISCLOSURE

In one aspect of the disclosure, a batch of raw milk is separated at a lowered, above-freezing temperature to separate the fat component from the protein and carbohydrate components, which together form skim milk. The skim milk is next pasteurized to eliminate the presence of any bacteria or other pathogens. Following pasteurization, the pasteurized skim milk may be stored at a reduced temperature for further processing for up to 72 hours, or may be immediately subjected to further processing with Ultra-Filtration (UF) and Ultra-Centrifugation (UC) with the skim milk cooled to about 15° C. If to bused in Ultra-Filtration, the pasteurized skim milk is passed through a pre-filter to remove any large solids, or to prevent conglomerated particles from forming.

The UF unit is constructed from material suitable for product contact such as 304 stainless steel or better. Its product contact tubing finish is 32 Ra maximum and its tank sheet metal finish is 2B. All process connections are made with tri-clamps. In an illustrative embodiment, the specialized UF filtration unit is designed to operate in a continuous mode and is based upon up to about 20 hours of operation producing product and then about 4 hours of a clean in place (CIP) sanitation process per day.

The feed material is introduced into the unit on a continuous basis with the concentrate and the permeate drawn off continually throughout the production run at a pre-set concentration level. The pre-set concentration level may be set within a designated range. CIP capabilities are built integrally to the system with provisions for circulation of a cleaning agent followed by a sanitary water rinse.

The mass balance of feed material may involve the following content parameters. For skim milk as the feed material, the following component concentrations may be present:

|  | FEED | PERMEATE | CONCENTRATE |
| --- | --- | --- | --- |
| True Protein % | 3.18 | 0.01 | 6.03 |
| NPN % | 0.16 | 0.14 | 0.17 |
| Lactose Content % | 4.78 | 4.80 | 4.76 |
| Acid % | 0.10 | 0.10 | 0.10 |
| Ash % | 0.72 | 0.45 | 0.96 |
| Fat % | 0.06 | 0.00 | 0.11 |
| Concentrate Ration |  |  | 1.9X |
| T.S. % | 9.0 | 5.50 | 12.14 |
| Feed Rate | 5.43 gpm |  |  |
| Concentrate Rate |  |  | 2.83 gpm |
| Permeate Rate |  | 2.60 gpm |  |

The filtration unit used in at least one embodiment of the disclosure may have the following properties:
  Number of Stages—One
  Total Number of Membrane Elements—Three
  Total Membrane Area—58 M2
  Membrane Model—6338 Spiral Wound
  Membrane Type—Polyether Sulfone (PES)
  ATD Type—Stainless Steel The skim milk is then further separated quantitatively into a solid phase (Casein micelles, Fat Globules, Globular Proteins) and a liquid phase (containing dissolved sugars, minerals and lipoprotein particles) by Ultra-Centrifugation. Finally, the liquid phase of the milk is pumped into a multiphase UF unit. The solid phase of the skim milk may be pooled quantitatively at 7° C. until the UF-UC procedure is complete. As used herein, Ultra Centrifugation shall mean exposing the skim milk to a centrifugal force equal to, or exceeding, about 20,000 rpm.

The solid phase isolated with Ultra-Centrifugation is collected quantitatively in a jacketed stainless-steel tank equipped with a low vortex agitator to reduce frothing during mixing. The collected solid phase is slowly agitated continuously to prevent sedimentation. The process continues with processing steps performed on the liquid phase.

The liquid phase is quantitatively pumped into the Ultra-filtration system which meets 3A sanitary dairy standards and contains the following conventional operative elements: pumps, motors, flow transmitters, temperature transmitters, pressure transmitters, proximity switches, pressure gauges, process valves, a process control valve, sample valves, check valves, steam valves, steam traps, and a cooling media control valve. All of these components are used to precisely control the disclosed processing steps.

The liquid phase, isolated via Ultra-Centrifugation, is further subjected to $CO_2$ bubbled into the liquid to drop the pH of the liquid. In one aspect of the disclosure, the pH level is maintained from about 3.2 pH to about 6.5 pH, or from about 4.5 pH to about 5 pH. The carbonated liquid is maintained at a temperature of about 5° C. to cause the remaining Lactose to crystallize out of solution. The remaining Lactose is removed with an additional filter step through a 40-micron filter. The finished liquid phase is now added back quantitatively to the preserved solid phase with milk agitation to reconstitute Lactose-free skim milk. The resulting skim milk also may be spray dried and stored in powder form.

In another aspect of the disclosure the low calorie, Lactose-free skim milk prepared in accordance with the Lactose removal process disclosed herein is now brought to about 65° F. with $CO_2$ gas added to the liquid phase. This procedure is continued until the pH of the liquid phase drops to between about 4.5 and about 4.6. The process is continued until the casein of the milk coagulates. The coagulated milk is passed again through a filter to remove the coagulant as the retentate and allow the serum to pass through as the permeate. The coagulated retentate is retained. Calcium chloride is now added to the serum permeate.

The pH of the milk serum is adjusted to from about 6.5 to about 7.0 by the addition of a base such as sodium hydroxide (NaOH). A white crystalline precipitate of calcium phosphate is formed and removed by passing the milk serum through UF to retain the calcium phosphate precipitate as retentate and allow the Phosphorus-reduced serum to pass as permeate. The Phosphorus-reduced serum is now re-mixed with the reserved casein quantitatively to form a low-calorie, Lactose-free and low-phosphorus skim milk. These and other aspects of the disclosure will become apparent from a review of the appended drawings and a reading of the following detailed description of the disclosure.

DETAILED DESCRIPTION OF THE DISCLOSURE

In one aspect of the disclosure, Bovine somatotropin (rBST) hormone-free raw milk in a 2,710-kg batch is separated into skim milk and cream at about 4° C. The cream is pooled in a stainless steel jacketed tank and chilled to about 7° C. and may be used to make butter, ice cream or other dairy products. The separation step may take place at a temperature from about 5° C. to about 7° C. The skim milk component is then pasteurized at a temperature of approximately 72° C. for about 16 seconds. The pasteurization temperature can vary about +/−2° C. The pasteurized skim milk is then re-cooled to about 4° C. if it is to be stored prior to processing. The skim milk may be stored for a maximum of about 72 hours before processing with Ultra-Filtration (UF) and Ultra-Centrifugation (UC). If the pasteurized milk is to be processed immediately, the milk is pre-cooled to about 7° C. before proceeding. The temperature for this processing step can vary about +/−2° C., or from about 5° C. to about 9° C.

The pasteurized skim milk should be free of any additives and suspended solids. To eliminate the presence of any suspended solids, the milk should be pre-filtered with a filter having pore sizes from about 30 microns to about 40 microns to produce a skim milk product with the following properties and specifications:

TOTAL PLATE COUNT—maximum 20,000/ml
SEDIMENT TEST—maximum 0.5 mg
pH—between 6.6-6.8
TITRATABLE ACIDITY—maximum 0.15% as lactic acid
FAT CONTENT—maximum 0.5% by Mojonnier
ENTRAPED AIR—maximum 0.5% by volume The pre-filtered, pasteurized skim milk is now cooled down to approximately 4° C. with constant agitation in preparation for the next processing step. Once the skim milk is cooled to the desired temperature, the skim milk is further processed with Ultra-Centrifugation (UC) to separate the milk into solid and liquid phases. The solid phase is collected quantitatively and stored in a jacketed stainless-steel tank equipped with an agitator to agitate the milk to maintain the solids in a suspension. This phase of the milk includes Casein micelles, Fat Globules and Globular Proteins.

Next, the separated liquid phase (containing water, dissolved sugars, minerals and lipoprotein particles) is pumped into the previously described Ultra-Filtration unit (UF). The unit includes a feed section dimensioned and structured to provide adequate flow and pressure to the UF unit during both production and CIP. To that end, the Feed Section parameters are as follows:

Feed material: Skim Milk
Feed Rate (Liters/Hr.): about 1,140 (5.0 gpm)
Feed Solids: (% TS): about 9.08
Feed Protein %: about 3.21 (about 37.1% protein/total solids)
Feed Lactose %: about 4.82
Feed Ash %: about 0.73
Feed NPN %: about 0.16
Feed Fat %: about 0.06
Concentration Ratio: about 2.2×
Concentrate Solids (% TS): about 13.26 (about 54.5% protein/total solids)
Operating Temperature: about 10° C.
Operating Pressure: about 40 psig
Mode of Operation: Continuous These are optimum conditions set to assure maximum yield and minimal clogging of the filter membranes. It should be understood that the parameters, e.g., feed rate, can be altered from the optimum conditions to produce milk products that remain within the scope and spirit of the disclosure.

The feed section of the unit consists of conventional operative elements, commonly known by those having ordinary skill in the art, including a Flow Divert Plate, Proximity Switch, Pneumatically Activated Sanitary Valves, CIP Water Butterfly Valve with Positioner, a Check Valve, a Sample Valve, a Feed Balance Tank which may have a capacity of from about 10 to about 25 gallons, a set of Feed Pumps to provide adequate feed flow at desired pressure during production and CIP, a CIP Shell and Tube Heat Exchanger, a Feed Tank Level Transmitter, Feed Flow Meter, Pressure Transmitter, Temperature Transmitter, Pressure Gauges and a Security Screen with ¼" holes designed to prevent foreign material from entering into the system. It should be understood that the conventional components of the processing apparatuses used to perform the processes disclosed herein do not form an integral part of the processes as different apparatus configurations may be used to perform the disclosed processes. It further should be understood that any disclosed apparatuses used to perform the disclosed processes do not limit the scope of the disclosed processes.

After passing through the Feed Section of the unit, the liquid phase passes into the Ultra-Filtration stage that contains a re-circulation pump to provide a constant cross flow condition over the enclosed filter membranes to optimize flux and minimize fouling. The UF stage also contains a shell and tube heat exchanger and a temperature transmitter. The filters used for the UF unit may be constructed in a form selected from the group consisting of filter membranes, filter media, hollow fibers, tubular membranes, spiral wound and combinations thereof. As used herein, "filter material" and/or "filtration material" shall mean any filter membrane, filter media, or any other material or substance used to filter fluids including liquids and gases.

Filtration materials may be constructed from hydrophilized polyethersulfone (PES), nylon, cellulose acetate, cellulose nitrate, hydrophilized polyvinylidene (PVDF), polycarbonate, as well as others well known in the art. As an illustrative embodiment, the filters used are hydrophilic spiral wound with pore sizes ranging from about 0.5 microns to about 40 microns. Multiple layers may be used, each with different pore sizes and even different porosities.

The UF stage filters the pasteurized liquid portion of the skim milk to remove Lactose and a small amount of minerals (i.e. calcium, phosphorus and water) to form a filtered liquid phase. After leaving the UF stage, the filtered liquid phase passes into the concentrate section which removes and directs any concentrates to either the downstream processing drain or to a return path back to the feed balance tank for recycling/filtering. This section consists of Pneumatically Activated Sanitary Valves, a Concentrate Flow Control Valve, a Sample Valve, a concentrate Flow Meter, Pressure Transmitters and a Concentrate Transfer Pump that collectively provide a means of transferring concentrate to further downstream processing. After leaving the concentrate section, the filtered liquid phase component now enters a permeate section of the UF unit.

In this section, the filtered liquid phase or permeate is directed to one of at least three possible paths. The first path directs the permeate further downstream for additional processing. The second path eliminates the permeate via a drain. The third path sends the permeate back to the Balance Tank for recycling. The permeate section includes Pneumatically Actuated Sanitary Valves, Sample Valves and a permeate transfer pump which provides a means of transferring any permeate to further downstream processing, a permeate flow meter and a pressure transmitter.

After leaving the UF system, food-grade Carbon Dioxide ($CO_2$) is bubbled through the filtered liquid phase to reduce the pH from about 4.5 to about 5.0. The $CO_2$ infused filtered liquid phase is permitted to stand at a constant 4° C. for approximately 6-10 hours. The hold temperature can vary from about 3° C. to about 7° C. At the end of the 6-10-hour period, the $CO_2$ infused filtered liquid phase is again passed through the pre-filter to remove any crystals of Lactose that may have formed to produce a Lactose-free $CO_2$ infused filtered liquid phase. Through the multi-stage filtering, centrifugation and re-cycling process, up to this point in the process, approximately 100% of the resident Lactose is removed from the liquid. Any milk sugars remaining in the liquid is naturally occurring and not derived from Lactose. For example, the monosaccharides that comprise Lactose, Glucose and Galactose, may be present naturally in their monosaccharide form in very low percentages per volume of liquid.

The solid and $CO_2$ infused filtered liquid phases are now recombined to form filtered Lactose-free skim milk in the stainless steel jacketed tank with no sheer agitation to assure thorough mixing. This process is maintained at about 4° C. by flowing glycol or other cooling agent through the jacket of the tank. The set tank temperature can fluctuate from about 1° C. to about 7° C. and still maintain the filtered skim milk product in an acceptable potable condition.

The process disclosed herein isolates Lactose from the other milk components. The Lactose by-product obtained from the UF process is pooled in a separate holding tank and may be purified and sold as a purified Lactose ingredient to bakers, animal food manufacturers and the pharmaceutical industry. The re-combined solid and liquid phases may be bottled and pasteurized in the final processed form to render a low-calorie, Lactose-free milk product. The final product, produced with the processes disclosed herein, represents the first low-calorie, Lactose-free grade A milk, flavored or unflavored, whole or skim, produced anywhere in the Western Hemisphere and the only Lactose-free product produced without Lactose hydrolyzation. The final product may be incorporated into a variety of beverages, including straight low-calorie, Lactose-free skim milk, and/or be used as a liquid ingredient for various low caloric, Lactose-free milk-based beverages.

The final product may also be spray dried at low heat to produce a low-calorie, Lactose-free skim milk powder useful in the commercial baking or pharmaceutical industries. It is expected that yields of 100% of removed Lactose are possible with the disclosed Lactose-removal process. Unlike prior processes that use enzymatic hydrolysis of the Lactose molecule to remove Lactose, the process disclosed herein removes the entire concentration of the Lactose disaccharide and does not leave any monosaccharides, glucose and Galactose, in the final product. Due to the complete removal of Lactose, all the calories associated with the Lactose disaccharide are eliminated from the final product. Moreover, the relatively long, twenty-hour incubation period needed to complete lactose hydrolysis is eliminated with this process.

In another aspect of the disclosure, the low calorie, Lactose-free skim milk, prepared in accordance with the Lactose removal process disclosed herein, is now brought to about 65° F. with mild agitation in a jacketed stainless-steel tank with $CO_2$ gas added to the liquid phase through a sparger as it recirculates back into the tank. This procedure is continued until the pH of the liquid phase drops to between about 4.5 and about 4.6. The process is continued until the casein of the milk coagulates. The coagulated skim milk is passed again through a 40-micron filter to remove the coagulant as the retentate and allow the serum to pass through as the permeate. The coagulated retentate is retained. Calcium chloride is now added to the serum permeate in an amount to provide about 3-4 moles of calcium for every 2 moles of phosphorus in the milk. (Milk serum contains about 0.3-0.7% protein and about 0.063-0.071% phosphorus).

The pH of the milk serum is adjusted to from about 6.5 to about 7.0 by the addition of a base such as sodium hydroxide (NaOH). A white crystalline precipitate of calcium phosphate is formed and removed by passing the milk serum through UF as disclosed herein to retain the calcium phosphate precipitate as retentate and allow the Phosphorus-reduced serum to pass as permeate. The Phosphorus-reduced serum is now re-mixed with the reserved casein quantitatively to form a low-calorie, Lactose-free and low-phosphorus skim milk. The composition of the Lactose-free, low-phosphorus skim milk compares to standard skim milk as follows:

| | MILK COMPARISON Per 8 oz. Serving | |
|---|---|---|
| | Low Calorie, Lactose Free Phosphorus Reduced Skim Milk | Standard Skim Milk |
| Protein | 14.0 g | 8.26 g |
| Calcium | 326 mg | 306 mg |
| Magnesium | 32 mg | 27 mg |
| Phosphorus | 49.4 mg | 247 mg |
| Lactose | <5.0 g | 12.47 g |
| Potassium | 389 mg | 382 mg |
| Carbohydrate | <5.0 g | 12.15 g |
| Sugar | <1.0 g | 12.0 g |

To maintain the desired level of Calcium in the skim milk, additional Calcium may be added to the mixture in the form of Calcium Gluconate or Calcium Citrate in a final amount of from about 4.8 to about 5.3 gm/gallon of skim milk. The final product has elevated concentrations of protein, essentially no Lactose and the calories associated with Lactose, and low levels of phosphorus that amount to less than 80% of the phosphorus levels found in conventional milk products such as whole milk and skim milk. Because a significant portion of the milk solids have been removed, e.g. cream and Lactose, the concentration of the remaining protein based component of the skim milk is higher per unit volume of milk. Rather than 8 grams of protein per pint, the final product has 14 grams of protein per pint.

While the present disclosure has been described in connection with several embodiments thereof, it will be apparent to those skilled in the art that many changes and modifications may be made without departing from the true spirit and scope of the present disclosure. By way of illustration and not limitation, the starting material for the phosphorus removal process can be whole milk or skim milk that has not undergone the Lactose removal process disclosed herein. Accordingly, it is intended by the appended claims to cover all such changes and modifications as come within the true spirit and scope of the disclosure.

What I claim as new and desire to secure by United States Letters Patent is:

1. A method of preparing Lactose-free milk comprising the steps of:
   providing skim;
   pasteurizing the skim milk;
   pre-cooling the skim milk from about 5° C. to about 9° C.;
   pre-filtering the skim milk with a filter having pore sizes from about 30 microns to about 40 microns to remove any suspended solids to form pre-filtered, pasteurized skim milk;
   cooling the pre-filtered, pasteurized skim milk to about 4° C.;
   separating solid and liquid phases of the pre-filtered, pasteurized skim milk with Ultra-Centrifugation to produce a solid phase comprising Casein Micelles, Fat Globules and Globular Proteins and a liquid phase comprising water, dissolved sugars, minerals and lipoprotein particles;
   collecting and storing the solid phase in a stainless-steel tank;

pumping the liquid phase into a feed section of an Ultra-Filtration unit;

filtering the liquid phase by passing it through a filter secured in the Ultra-Filtration unit, wherein the filter has a plurality of pores having pore sizes ranging from about 0.5 microns to about 40 microns, and wherein a portion of Lactose and a portion of minerals present in the liquid phase are filtered out to form a filtered liquid phase;

cooling the filtered liquid phase to between about 5° C. and 7° C.;

bubbling $CO_2$ into the filtered liquid phase to reduce the pH to from about 4.5 to about 5.0 to cause any Lactose present to form into Lactose crystals and to form a $CO_2$ infused filtered liquid phase;

returning the $CO_2$ infused filtered liquid phase to the pre-filter;

passing the $CO_2$ infused filtered liquid phase through the pre-filter to remove any Lactose crystals present to form a lactose-free, $CO_2$ infused filtered liquid phase; and, recombining the solid phase with the lactose-free, $CO_2$ infused filtered liquid phase in the stainless-steel tank to form Lactose-free skim milk.

2. The method of claim 1 further comprising the initial steps of:

providing raw milk comprising skim milk and cream;

separating the skim milk and the cream by lowering the temperature of the raw milk to between about 2° C. and about 7° C.; and, removing the cream.

3. The method of claim 1 further comprising the steps of:

pooling the cream in a jacketed stainless-steel tank; and, chilling the separated cream to about 7° C.

4. The method of claim 1 further comprising the step storing the pasteurized skim milk at a temperature of about 4° C. before the pre-cooling step.

5. The method of claim 1 further comprising agitating the pre-filtered, pasteurized skim milk while cooling it down before the Ultra-Centrifugation step.

6. The method of claim 1 further comprising the step of agitating the solid phase when collecting and storing the solid phase in a jacketed stainless-steel tank to maintain solids in suspension.

7. The method of claim 1 further comprising the step of passing the filtered liquid phase into a concentrate section of the Ultra-Filtration unit to remove and direct concentrates to a path selected from the group consisting of a downstream path for further processing, a drain path for elimination, a recycling path and combinations thereof.

8. The method of claim 1 further comprising the step of permitting the $CO_2$ infused liquid phase to stand for approximately 6-10 hours before recycling the $CO_2$ infused liquid phase through the pre-filter.

9. The method of claim 1 further comprising the step of spray drying the Lactose-free skim milk to product Lactose-free skim milk powder.

* * * * *